United States Patent [19]

Akazawa

[11] Patent Number: 5,932,305
[45] Date of Patent: Aug. 3, 1999

[54] COMPOSITE SHEET AND SEALED CONTAINER

[75] Inventor: Seigo Akazawa, Tokyo, Japan

[73] Assignee: Sumitomo Bakelite Company, Limited, Tokyo, Japan

[21] Appl. No.: 08/979,935

[22] Filed: Nov. 26, 1997

[51] Int. Cl.⁶ .............................. B29D 22/00; B32B 1/08
[52] U.S. Cl. .................. 428/35.7; 428/35.9; 428/36.6; 428/36.7; 428/334; 428/412; 428/476.3; 428/515; 428/518
[58] Field of Search .................................. 428/412, 35.7, 428/35.9, 36.6, 36.7, 515, 518, 334, 476.3

[56] References Cited

U.S. PATENT DOCUMENTS

| | | | |
|---|---|---|---|
| 4,559,266 | 12/1985 | Misasa et al. | 428/341 |
| 5,510,448 | 4/1996 | Fontane | 528/196 |

FOREIGN PATENT DOCUMENTS 577865  3/1993  Japan .

OTHER PUBLICATIONS

Database WPI, Section Ch, Week 9809, Class A17, AN 98–095511, JP 09 323 762A, Dec. 16, 1997, abstract.
Japanese Kokai JP–A 3('91)–244 Jul. 1, 1991.
Japanese Kokai JU–A 61('86)–115626 Jul. 22, 1986.
Japanese Kokai JP–A 60('85)–68938 Apr. 19, 1985.
Japanese Kokai JP–A 5('93)–77865A Mar. 30, 1993.

*Primary Examiner*—Leszek Kiliman
*Attorney, Agent, or Firm*—Smith, Gambrell & Russell, LLP; Beveridge, DeGrandi, Weilacher & Young Intellectual Property Group

[57] ABSTRACT

A sealed container obtained by forming into a container a sheet comprising (A) a polymer of three-component system of bisphenol A, diphenyl carbonate and 1,10-decanedicarboxylic acid, (B) polypropylene and (C) ethylene-vinyl alcohol copolymer or polyamide obtained by the polycondensation reaction of m-xylylenediamine with adipic acid so that these (A), (B) and (C) are in order of (A)-(B)-(C)-(B) with (A) as an innermost layer of the container and sealing the container by a lid having gas barrier properties. This container is excellent in preservability and sealability and does not spoil the flavor of various foods which are contained therein.

5 Claims, No Drawings

COMPOSITE SHEET AND SEALED CONTAINER

BACKGROUND OF THE INVENTION

The present invention relates to a composite sheet and sealed container excellent in preserving ability and resistance to deterioration of contents contained therein.

Hitherto, as preserving containers made of plastics, there have been used those which comprise a gas barrier layer comprising an ethylene-vinyl alcohol copolymer or a vinylidene chloride copolymer, both sides of which are laminated with polyolefins such as polypropylene and polyethylene. These containers have been widely used as having both the gas barrier properties and sealing properties with a lid. However, with the progress of investigation on deterioration of contents contained in the containers, it has been found that in the case of containers having an innermost layer comprising a polyolefin, the innermost layer adsorbs flavor of the contents or an odor component of the innermost resin layer soaks into the contents. Thus, an innermost layer formed of other than polyolefins has been demanded.

As containers having these flavor characteristics, those which have an inner layer comprising polyethylene terephthalate, ethylene-vinyl alcohol copolymer and polycarbonate have been proposed (JP-A- 3(1991)-244 and JP-B-55(1980)-13907). Among them, the former can be used for hot-filling of contents or low-temperature sterilization (lower than 100° C.) of contents, but cannot be used for high-temperature sterilization (retorted foods) because the innermost layer is softened with heat. On the other hand, as resins covering these defects, use of the latter polycarbonate has been proposed (JU-B-5(1993)-8127, JU-A-61(1986)-115626, and JP-A-60(1985)-68938). However, since polycarbonate is a heat resistant resin, it is poor in heat sealability, and if usual heat sealing is to be carried out, 230° C. or higher of sealing platen temperature is needed and in this case, the lid material sometimes melts and deteriorates and thus a sufficient sealing cannot be obtained at temperatures at which the lid material is not deteriorated. Furthermore, in combination with other resins, when a multi-layer sheet is subjected to vacuum forming, the forming cannot be satisfactorily performed because the polycarbonate is a heat resistant resin.

SUMMARY OF THE INVENTION

Various investigations have been made for solving these problems of conventional sealed containers, and the object of the present invention is to provide a composite sheet and sealed container which are excellent in preservation properties and sealing properties and do not spoil the flavor of various foods contained in the container.

The present invention is a composite sheet which comprises (A) a polymer of three-component system comprising bisphenol A, diphenyl carbonate and 1,10-decanedicarboxylic acid, (B) polypropylene and (C) ethylene-vinyl alcohol copolymer or polyamide obtained by the polycondensation reaction of m-xylylenediamine with adipic acid, these (A), (B) and (C) being laminated in order of (A)-(B)-(C)-(B) with (A) as an innermost layer. Polymerization molar ratio of the 1,10-decanedicarboxylic acid component of the polymer (A) is preferably 5–20%. Thickness of the polymer (A) is preferably 10% or less of the total thickness. Melt flow rate of the polypropylene (B) is preferably 2.0 or less, and thickness of the polypropylene layer is preferably 50% or more of the total thickness.

The present invention further relates to a sealed container obtained by forming the composite sheet into a container so that the three-component polymer (A) is the innermost layer and sealing the container with a lid having gas barrier properties.

DESCRIPTION OF THE INVENTION

The three-component copolymer used in the present invention comprises the three components of bisphenol A, diphenyl carbonate and 1,10-decanedicarboxylic acid. The polymerization molar ratio of bisphenol A and diphenyl carbonate is 1:1, and that of bisphenol A and 1,10-decanedicarboxylic acid is in the range of 95:5–80:20.

The polypropylene used in the present invention includes various polypropylenes such as homopolymers, copolymers, random polymers, etc. as far as they have a melt flow rate of 2.0 or less. Furthermore, the polypropylene may be mixed with other resins such as polyethylene in an amount which does not change the melt flow rate.

The ethylene-vinyl alcohol copolymer used in the present invention includes optional ones as far as the copolymerization ratio of ethylene is 20–45%.

The polyamide obtained by the polycondensation reaction of m-xylylenediamine with adipic acid (hereinafter referred to as MXD6 nylon) shows excellent gas barrier properties which would be superior to that of ethylene-vinyl alcohol copolymer depending on the conditions.

These resins can be laminated by any known lamination methods such as co-extrusion method, co-extrusion lamination method, extrusion lamination method and dry lamination method. In order to bond these resins for lamination, there may be used adhesives or adhesive resins suitable for the respective resins. As method for forming these multi-layer sheets into containers, there may be generally employed vacuum forming method, air-pressure forming method and vacuum air-pressure forming method.

The lid materials used in the present invention include any of those which can be sealed with the innermost layer and have gas barrier properties. Examples thereof are three-layer films comprising a sealant layer of a heat-sealing polyethylene terephthalate, a barrier layer of vinylidene chloride copolymer and an outermost layer of nylon, or a sealant layer of a heat-sealing polyethylene terephthalate, a barrier layer of an aluminum foil and an outermost layer of polyethylene terephthalate. Furthermore, the lid materials are not limited to those in the form of film, but those of molded form may also be used. For example, a multilayer sheet comprising a sealant of a heat-sealing polyethylene terephthalate, a barrier layer of ethylene-vinyl alcohol copolymer and an outer layer of polypropylene is molded into a form of thermal form lid by vacuum forming method and this can be used as a lid.

The lid and the body of container can be welded by known heat sealing method, ultrasonic sealing method, high-frequency sealing method and the like.

The innermost three-component copolymer layer used in the container of the present invention is used for protection of flavor of contents and for improvement of heat-sealing properties. This three-component copolymer component is superior in heat resistance to other thermoplastic resins and can also be used for foods which are to be subjected to retort sterilization and others. The 1,10-decanedicarboxylic acid among the three components is used for improvement of heat-sealing properties. Copolymer of bisphenol A and diphenyl carbonate is a polycarbonate and this is excellent in heat resistance and aromatic proof, but is inferior in heat-sealing properties as aforementioned. It becomes possible to improve heat-sealing properties by copolymerizing the above two components with a long aliphatic chain component. Thus, when a heat-sealing polyethylene terephthalate is used as a sealant of the lid, the former has a minimum heat-sealing temperature of 230° C. while the latter can be heat sealed at 200° C. which is lower by 30° C. In this case, if the copolymerization molar ratio of 1,10-decanedicarboxylic acid is less than 5%, heat-sealing properties cannot be improved and if it exceeds 20%, the aromatic proof is deteriorated.

In this way, heat-sealing properties are improved, but the heat resistance is still too high, and much quantity of heat is required for thermal forming of containers. Furthermore, drawdown at the time of heating of sheet is great and this is generally considered not to be suitable for vacuum forming method and pressure forming method which are of sheet thermal forming type. Therefore, it is preferred that thickness of the three-component copolymer is 10% or less of the total thickness. As for flavor suitability of contents, a sufficient function can be attained with this thickness, and more preferably the thickness is 5% or less.

The polypropylene layer in the present invention is used as a strength retaining layer, a water vapor barrier layer and a formability improving layer, and thickness ratio of this layer is preferably 50% or higher and melt flow rate of the polypropylene used is preferably 2.0 or less. If the melt flow rate exceeds 2.0, the drawdown at the time of heating is great and no satisfactory articles can be formed. Furthermore, if the thickness ratio of the polypropylene layer is less than 50%, the drawdown at the time of formation is great and this is not preferred for the formation of container. Moreover, the thickness ratio of the polypropylene layer is preferably 50% or higher also for reducing water absorption of ethylene-vinyl alcohol copolymer of gas barrier layer as much as possible at the time of retort sterilization. Ethylene-vinyl alcohol copolymer which is the gas barrier layer has the most excellent oxygen gas barrier properties among general-purpose thermoplastic resins, but the barrier properties are deteriorated by absorption of water. Furthermore, the tendency of water absorption is greater at higher temperatures, and when the container is treated in hot water, a water protective layer of outer layer is needed. For this reason, the water vapor barrier layer of outer layer must have a certain thickness.

EXAMPLE

The effects of the present invention are explained by the following examples.

Table 1 shows constructions of three multilayer sheets of the examples according to the present invention and four comparative multilayer sheets. These multilayer sheets were prepared by co-extrusion method. These multilayer sheets were formed into containers having a bore diameter of 80 mm$\phi$, a height of 50 mm and a bottom diameter of 40 mm$\phi$ by a vacuum forming machine of indirect heating type. These containers were filled with orange juice or curry sauce as contents. The former was hot-filled at 60° C. and the latter was subjected to retort sterilization at 120° C. for 30 minutes after filling, and thereafter, they were stored for one month at room temperature. They were compared on preservation properties and flavor of the contents. Furthermore, formability of the sheets at the time of hot forming was also evaluated. The results are shown in Table 2.

TABLE 1

| | | Construction of sheet | | | |
|---|---|---|---|---|---|
| | | Innermost layer | Inner layer | Barrier layer | Outer layer |
| Example | 1 | A1 (80) | PP(200) MFR = 1.0 | EVOH (100) | PP(520) MFR = 0.5 |
| | 2 | A2 (80) | PP(300) MFR = 0.5 | EVOH (100) | PP(400) MFR = 0.5 |
| | 3 | A3 (40) | PP(100) MFR = 2.0 | EVOH (100) | PP(600) MFR = 0.5 |
| | 4 | A3 (40) | PP(100) MFR = 0.5 | MXNy (100) | PP(660) MFR = 0.5 |
| Comparative Example | 1 | PC (200) | PP(200) MFR = 1.0 | EVOH (100) | PP(400) MFR = 0.5 |
| | 2 | PC (100) | PP(300) MFR = 3.0 | EVOH (100) | PP(400) MFR = 2.5 |
| | 3 | PC (400) MFR = 0.5 | — | EVOH (100) | PP(400) MFR = 0.5 |
| | 4 | PET (50) | PP(200) MFR = 1.0 | EVOH (100) | PP(550) MFR = 0.5 |
| | 5 | PC (50) | — | — | PP(850) |
| | 6 | PC (80) | PP(200) MFR = 1.0 | EVOH (100) | PP(520) MFR = 0.5 |

Note: The numeral in ( ) is the thickness ($\mu$m) of the sheet.

Abbreviations in Table 1 have the following meanings.

MXNy: MXD6 nylon

PC: Polycarbonate

PET: Polyethylene terephthalate

PP: Polypropylene

EVOH: Ethylene-vinyl alcohol copolymer

MFR: Melt flow rate

Copolymerization molar ratio of the resin of (A) is as follows:

Bisphenol A : diphenyl carbonate 1,10-decanedicarboxylic acid

A1: 91:91:9

A2: 94:94:6

A3: 81:81:19

TABLE 2

| | | Results of evaluation | | | | |
|---|---|---|---|---|---|---|
| | | Flavor | | Preservation property | | |
| No. | Formability | Orange juice | Curry sauce | Orange juice | Curry sauce | Sealability |
| Example 1 | ◯ | ◯ | ◯ | ◯ | ◯ | 210 |
| Example 2 | ◯ | ◯ | ◯ | ◯ | ◯ | 205 |
| Example 3 | ◯ | ◯ | ◯ | ◯ | ◯ | 215 |
| Example 4 | ◯ | ◯ | ◯ | ◯ | ◯ | 215 |

TABLE 2-continued

| | | Results of evaluation | | | | |
|---|---|---|---|---|---|---|
| | | Flavor | | Preservation property | | |
| No. | Form-ability | Orange juice | Curry sauce | Orange juice | Curry sauce | Seal-ability |
| Comparative Example 1 | X | ○ | ○ | ○ | ○ | 235*1 |
| Comparative Example 2 | X | ○ | ○ | ○ | ○ | 235*1 |
| Comparative Example 3 | ○ | X | X | ○ | ○ | 235*1 |
| Comparative Example 4 | ○ | Δ | Δ | ○ | ○ | 200 |
| Comparative Example 5 | ○ | ○ | ○ | X | X | 235*1 |
| Comparative Example 6 | ○ | ○ | ○ | ○ | ○ | 235*1 |

*1 Since heat-sealing temperature was high, appearance of the lid was bad.

Evaluation methods are as follows:

(1) Formability: Forming was carried out using molds by which forty-two containers having a bore diameter of 80 mmφ can be simultaneously formed.

○: Good articles were obtained.

x: Drawdown at the time of heating was great and satisfactory articles were not obtained. (Many wrinkles were formed.)

(2) Flavor: Evaluation on orange juice.

Amount of limonene (a component of orange juice) adsorbed to the innermost layer was measured.

○: Very small

Δ: Small x: Large (3) Flavor: Evaluation on curry sauce.

Tasting test was conducted on the content after stored for 1 month.

○: There was no change in flavor.

x: There was change in flavor. (Odor of plastics was developed.)

(4) Preservation properties: Evaluation on orange juice after stored for 1 month.

○: Decrease in content of vitamin C was a little and it had a good taste.

x: Decrease in content of vitamin C was great and change was seen.

(5) Preservation properties: Evaluation on curry sauce after stored for 1 month.

○: Oxidation of oil component was a little and the curry sauce was fit for eating.

x: Oxidation of oil component was great and the curry sauce had rancid odor and was not fit for eating.

(6) Sealability: Minimum temperature at which the container could be sealed with a lid comprising PET ($12\mu$)/AL ($7\mu$)/heat-sealing polyethylene terephthalate ($50\mu$).

Sealing was examined by confirming whether leakage of the content occurred upon application of a load of 10 Kg to the lid or not.

According to the present invention, sealed containers which do not cause change in flavor of contents as compared with conventional plastic barrier multilayer containers are obtained by forming methods inexpensive like conventional methods.

What is claimed is:

1. A composite sheet which comprises (A) a polymer of three-component system comprising bisphenol A, diphenyl carbonate and 1,10-decanedicarboxylic acid, (B) polypropylene and (C) ethylene-vinyl alcohol copolymer or polyamide obtained by the polycondensation reaction of m-xylylenediamine with adipic acid, these (A), (B) and (C) being laminated in succession in order of (A)-(B)-(C)-(B) with (A) as an innermost layer.

2. A composite sheet according to claim 1, wherein the molar ratio of 1,10-decanedicarboxylic acid component in the three-component polymer (A) is 5–20%.

3. A composite sheet according to claim 1, wherein the thickness of the three-component polymer (A) is 10% or less of the total thickness.

4. A composite sheet according to claim 1, wherein the melt flow rate of the polypropylene (B) is 2.0 or less, and the thickness of the polypropylene layer is 50% or more of the total thickness.

5. A sealed container obtained by forming the composite sheet of any one of claims 1–4 into a container so that the three-component polymer (A) is the innermost layer and sealing the container by a lid having gas barrier properties.

* * * * *